United States Patent
Elkhouly et al.

(10) Patent No.: US 10,109,416 B2
(45) Date of Patent: Oct. 23, 2018

(54) TILED WIRELESS CHARGING COIL SOLUTION FOR EXTENDED ACTIVE AREA

(71) Applicant: INTEL CORPORATION, Santa Clara, CA (US)

(72) Inventors: Essam Elkhouly, Santa Clara, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 15/199,739

(22) Filed: Jun. 30, 2016

(65) Prior Publication Data

US 2017/0069421 A1    Mar. 9, 2017

Related U.S. Application Data

(63) Continuation of application No. 14/672,114, filed on Mar. 28, 2015, now abandoned.

(60) Provisional application No. 62/087,608, filed on Dec. 4, 2014.

(51) Int. Cl.
| | | |
|---|---|---|
| H01M 10/46 | (2006.01) | |
| H01F 38/14 | (2006.01) | |
| H02J 50/12 | (2016.01) | |
| H02J 7/02 | (2016.01) | |
| H02J 50/40 | (2016.01) | |

(52) U.S. Cl.
CPC ............ *H01F 38/14* (2013.01); *H02J 7/025* (2013.01); *H02J 50/12* (2016.02); *H02J 50/40* (2016.02)

(58) Field of Classification Search
CPC .......... H02J 7/025; H02J 7/0042; H02J 7/355; H02J 5/005

USPC .......................... 320/107, 108, 116; 307/104
See application file for complete search history.

(56) References Cited

U.S. PATENT DOCUMENTS

| | | | |
|---|---|---|---|
| 7,164,255 B2 * | 1/2007 | Hui | ..................... H01F 17/0006 320/108 |
| 2005/0189910 A1 | 9/2005 | Hui | |
| 2010/0259217 A1 | 10/2010 | Baarman et al. | |
| 2011/0281535 A1 | 11/2011 | Low et al. | |
| 2012/0119697 A1 * | 5/2012 | Boys | ..................... B60L 11/182 320/108 |

(Continued)

FOREIGN PATENT DOCUMENTS

| | | |
|---|---|---|
| KR | 10-1140338 B1 | 5/2012 |
| WO | 2012-170278 A2 | 12/2012 |

OTHER PUBLICATIONS

Xiao Lu, et al. "Wireless Charger Networking for Mobile Devices"; Fundamentals, Standards, and Applications, arXiv:1410.8635V2 [cs.NI] Dec. 9, 2014, 16 pages.

(Continued)

*Primary Examiner* — Edward Tso
(74) *Attorney, Agent, or Firm* — International IP Law Group, P.L.L.C.

(57) ABSTRACT

The disclosure generally relates to a method and apparatus for wireless charging station. In one embodiment, the disclosure provides an overlapping (or tiled) layout of a plurality of coils. Each coil may have a symmetric or an asymmetric turn layout. The disclosure also provides design optimization techniques configured to determine the optimal tile overlap distance and/or coil size to provide a substantially uniform electro-magnetic field over the surface of the wireless charging station.

20 Claims, 16 Drawing Sheets

(56) References Cited

U.S. PATENT DOCUMENTS

2012/0193996 A1    8/2012  Ryu et al.
2013/0229061 A1*  9/2013  Budhia .................. H01F 38/14
                                                307/104
2015/0332845 A1   11/2015  Werner et al.

OTHER PUBLICATIONS

International Search Report and Written Opinion for International Application PCT/US2015/058978 dated Feb. 17, 2016, 8 pages.

* cited by examiner

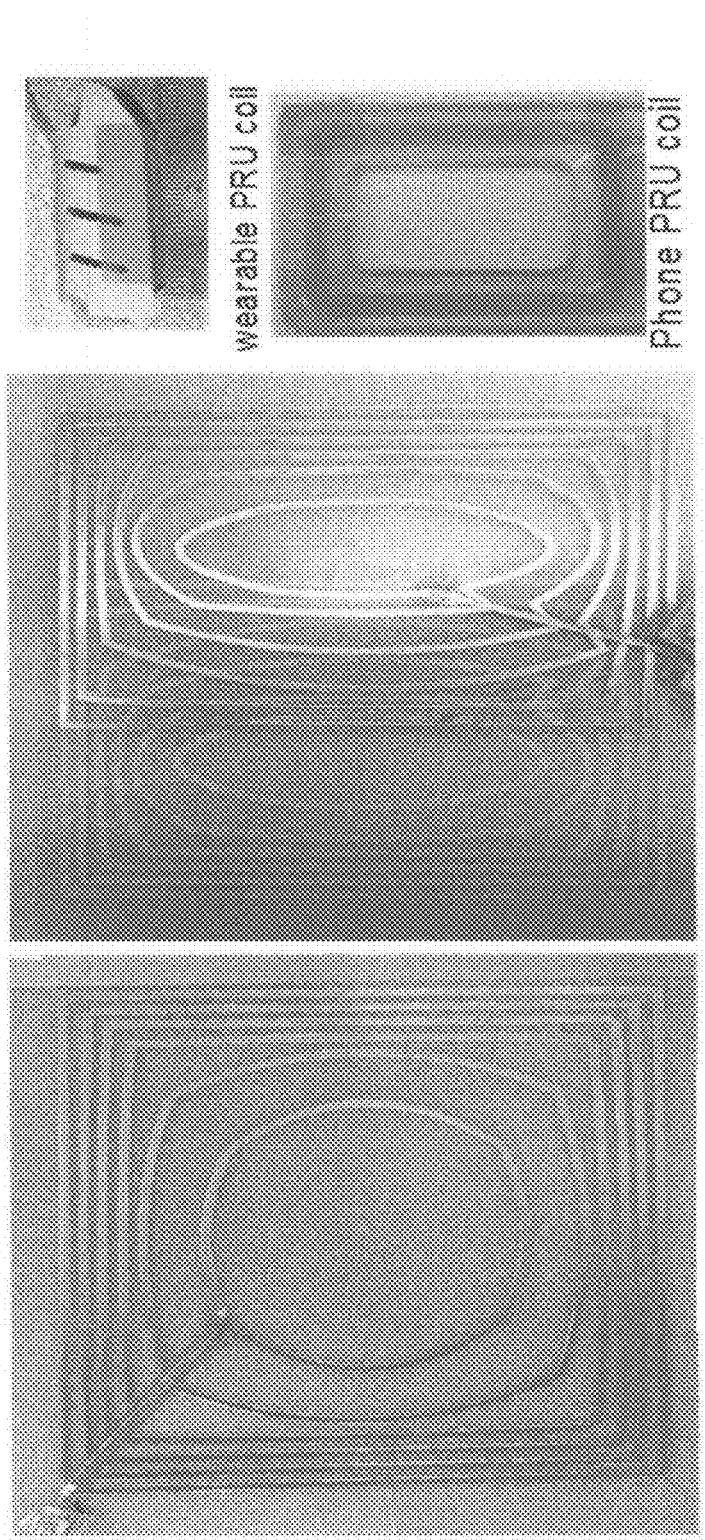

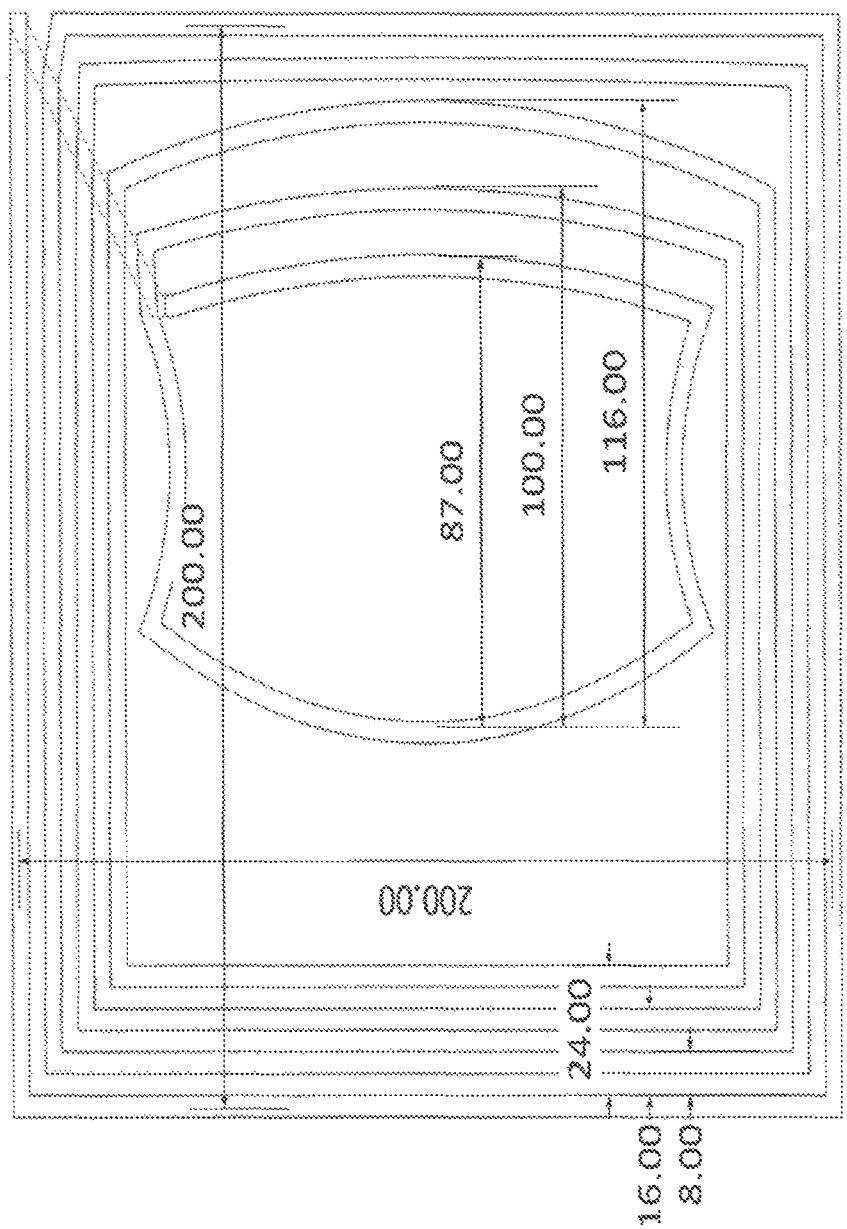

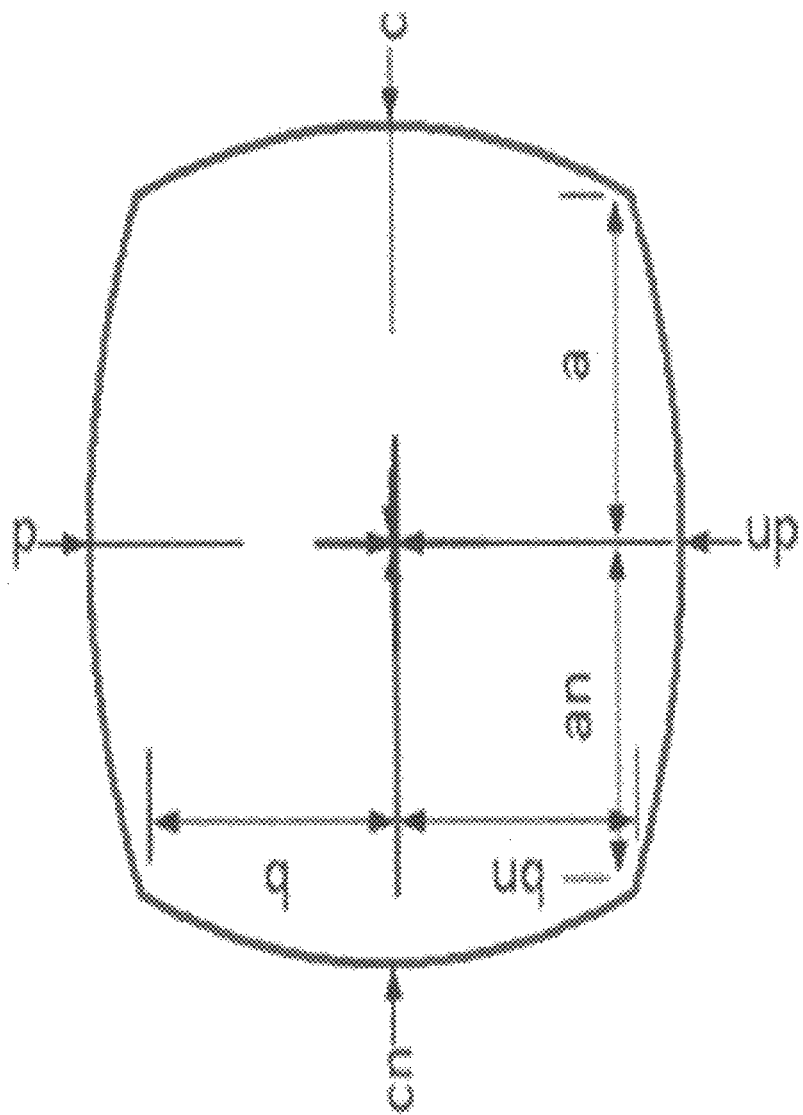

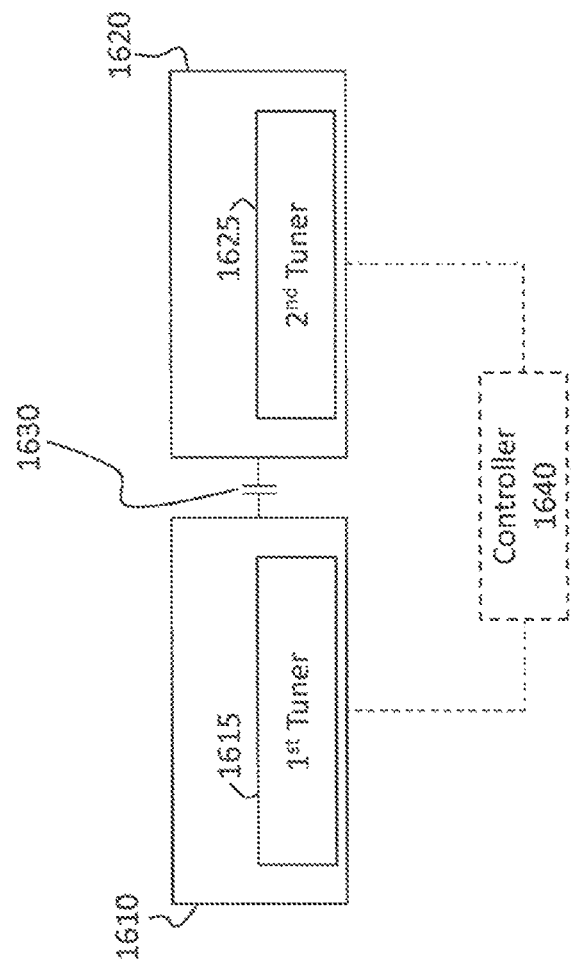

TILED WIRELESS CHARGING COIL SOLUTION FOR EXTENDED ACTIVE AREA

CROSS REFERENCE TO RELATED APPLICATION

The present application is a continuation application of U.S. application Ser. No. 14/672,114 filed Mar. 28, 2015, which claims the benefit of the filing date of U.S. Provisional Application No. 62/087,608, filed Dec. 4, 2014, both of these applications of which are incorporated herein in their entirety.

BACKGROUND

Field

The disclosure relates to a method, apparatus and system to wirelessly charge a device. Specifically, the disclosed embodiments provide improved charging stations for increased active charging area.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category e devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging is particularly important for devices having limited charging access such as implantable medical devices. There is a need for improved wireless charging systems to extend the active charging area and to improve coupling and charging uniformity.

BRIEF DESCRIPTION OF THE DRAWINGS

These and other embodiments of the disclosure will be discussed with reference to the following exemplary and non-limiting illustrations, in which like elements are numbered similarly, and where:

FIG. 5A shows a conventional coil;

FIG. 5B shows a two coil tiling;

FIG. 5C shows a phone receiver coil size;

FIG. 5D shows a wearable receiver coil size;

FIG. 6 shows one coil element of an exemplary two-by-one (2×1) array coil according to one embodiment of the disclosure;

FIG. 7 illustrates the eight degrees of freedom for the building block of the coil turns according to one embodiment of the disclosure;

DETAILED DESCRIPTION

Conventional wireless charging systems offer limited active charging area coverage. For broad enabling and infrastructure deployment of wireless charging systems (i.e., charging in coffee shops, airports, etc.) large active charging areas are required. However, extending charging area for magnetic resonance based wireless charging systems (A4WP) is challenging due to two fundamental issues. First, as the coil size increases with respect to operating wavelength, both the radiating and ohmic losses increase.

Figure 1:
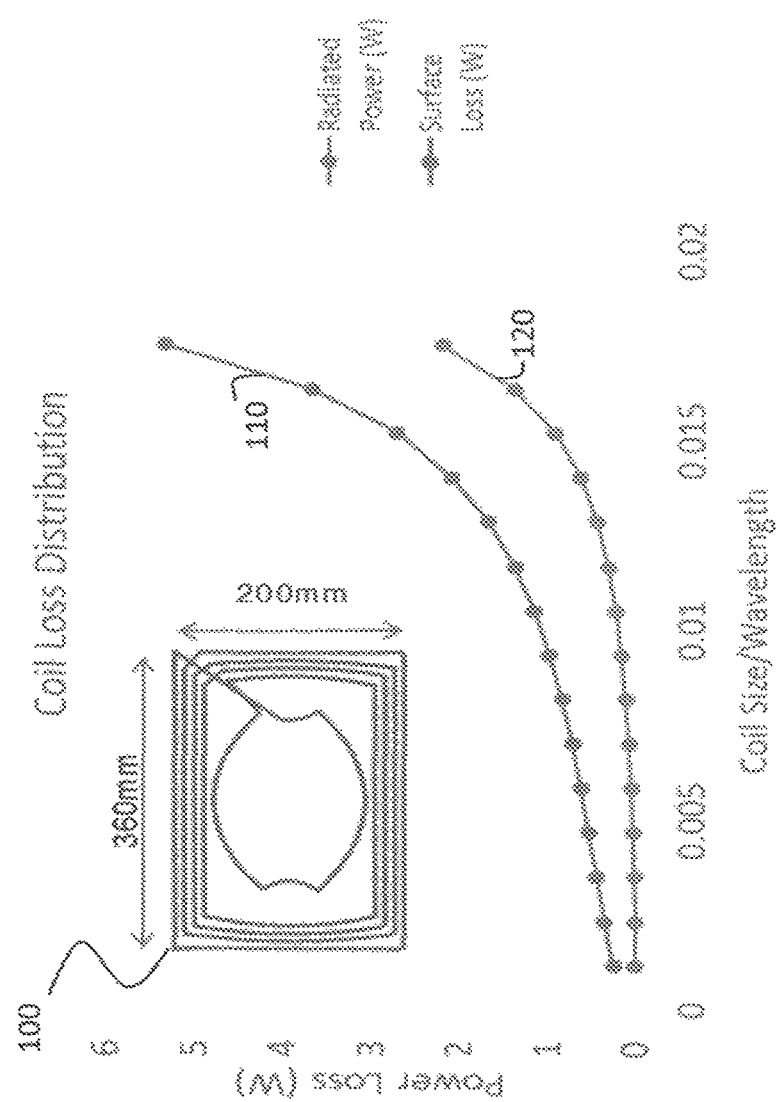
FIG. 1 shows radiation resistance as a function of a coil size over the wavelength of operating frequency.

FIG. 1 shows conventional radiation resistance as a function of the coil size length. Specifically, FIG. 1 shows the radiating and surface loss of a 4 turn spiral coil 100 when driven by constant 1A of AC current plotted at different coil diameter. As seen in FIG. 1, radiation loss increases dramatically as the coil size increases and the coil forms a more effective far field radiator. The surface (ohmic) loss 110 of coil 100 also increases as the size of coil grows and the coil comes closer to parallel (self) resonance. Both loss mechanisms experience non-linear growth when the coil size exceed certain limits. The increased loss degrades the quality factor of the coil and ultimately hinder the system's power transfer.

Figure 2:
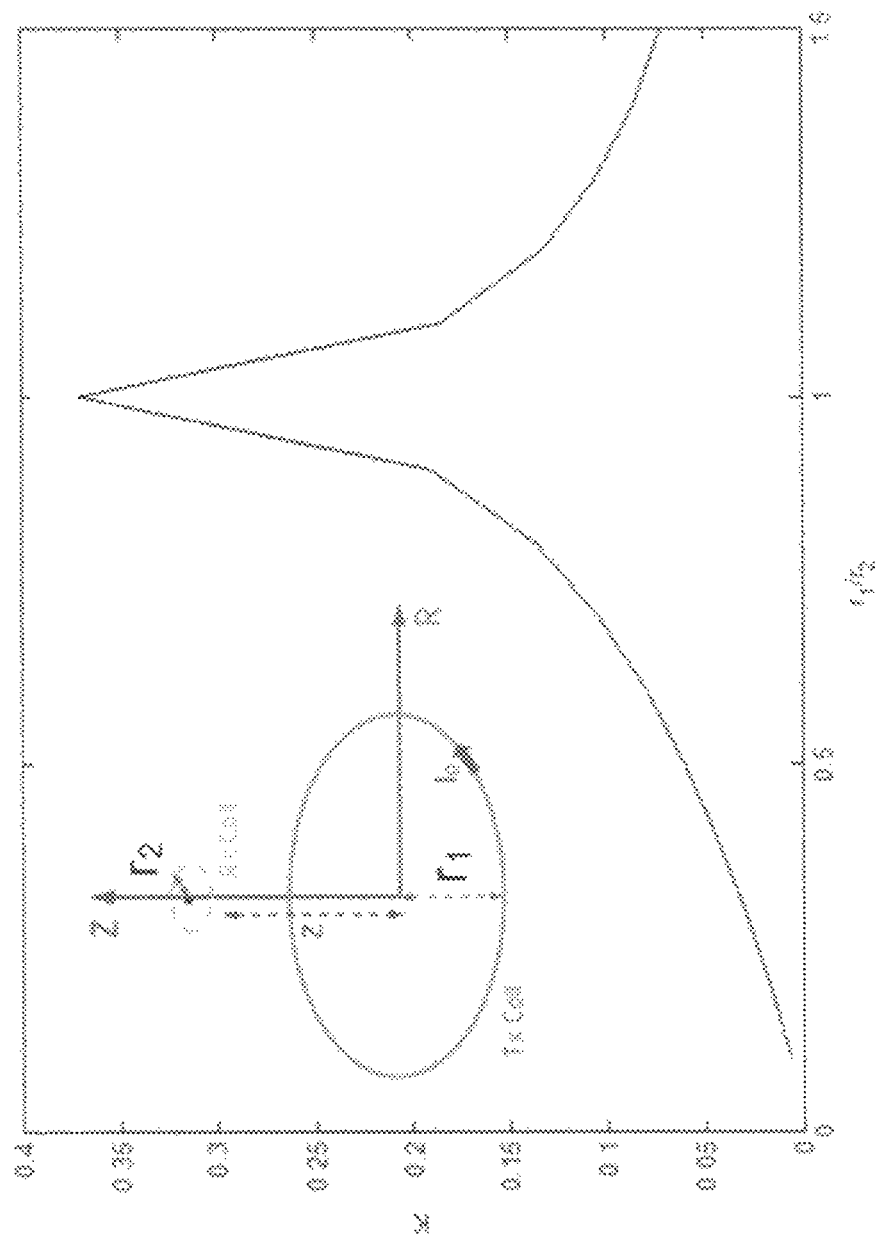
FIG. 2 illustrates coupling coefficient of two one-turn coils versus ratio of radii of two coils.

Second, for suitable power transfer efficiency, coupling coefficient between the transmitting and the receiving coils should be as high as possible. The coupling coefficient, K, between two closely spaced coils is inversely proportional to the size ratio of the transmitting and receiving coils. FIG. 2 illustrates coupling coefficient of two one-turn coils versus the ratio of the radius of the two coils. As shown in FIG. 2, the coupling coefficient K peaks when the transmitter and the receiver coils are about the same size. In reality, when the transmitter coil is grown to a very large size while the receiving coil is small (e.g., cell phone), the coupling and efficiency fall dramatically.

To overcome these and other deficiencies, an embodiment of the disclosure provides a tiled coil structure for transmitter coil design of a magnetic resonance (i.e., A4WP) wireless charging system. The disclosed embodiments solve the problem of extending the active charging area while maintaining significantly improved field uniformity, coupling and power transfer efficiency.

In certain embodiments, the coverage area of a wireless charging transmitter is extended by using an array of two coils next to each other. The two coils may be laid out as tiles. In another embodiment, the two coils are laid out as overlapping tiles. In still other embodiments, the tiled-coils may be connected in series. In certain embodiments, one or more of the coils may be individually tuned to substantially the same resonance frequency.

Figure 3A:
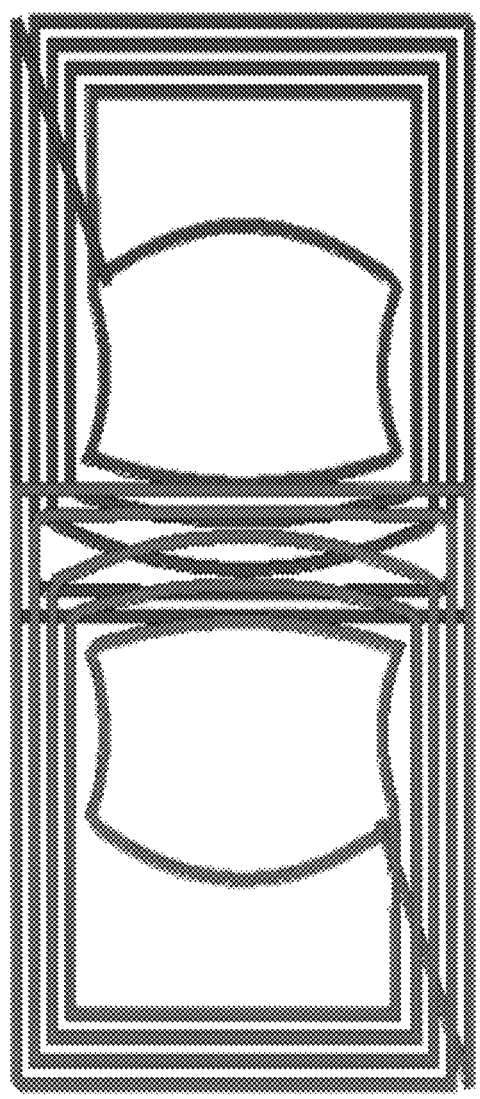
FIG. 3A illustrates tiling of two-by-one transmitting coil array according to one embodiment of the disclosure.

FIG. 3A illustrates tiling of 2×1 transmitting coil array according to one embodiment of the disclosure. In FIG. 3A, coil 310 is laid over coil 320 with a partial overlap. The embodiment shown in FIG. 3A enables the AC resistance (combination of both surface (ohmic) loss and radiation loss effects) of two smaller coils to be added linearly. The combined loss is much smaller than the AC resistance of a large coil with the combined sizes. The coupling coefficient between the smaller coil and device being charged is also higher due to the smaller size ratio. Overall the coil-to-coil efficiency (between the transmitting and receiving coils) of the tiled solution is higher.

Figure 3B:
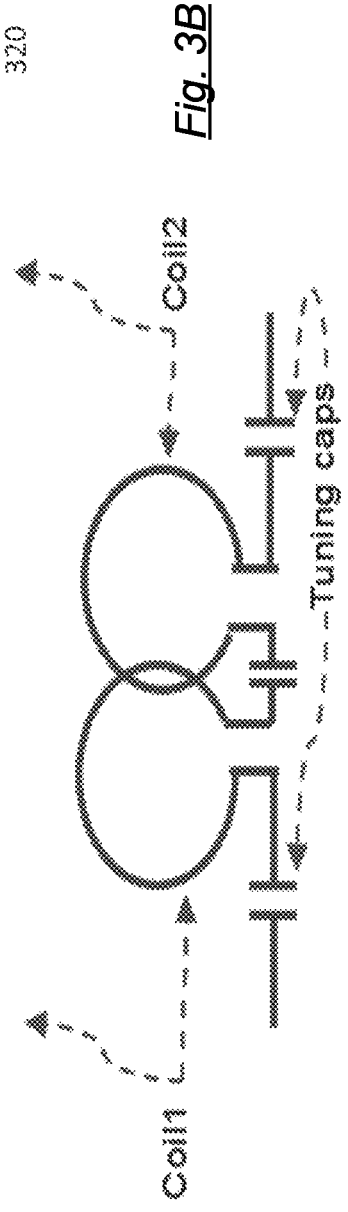
FIG. 3B illustrates an equivalent circuit for the tiled configuration circuit of FIG. 3A including tuning capacitors.

FIG. 3B shows the equivalent circuit for the tiled-coils of FIG. 3A. Each coil is individually tuned to the desired resonance by adding one or more tuning capacitor to each coil. The tuning capacitors are added in series with each other. The two coil tiles may be connected through the tuning capacitance positioned therebetween.

In one embodiment, the capacitance positioned in between two coils is substantially similar in value as the tuning cap at either end of the individual coil add in series. This arrangement may maximize the Q of the combined coil from two coil tiles by minimizing the mutual capacitance between the two coil tiles.

A challenge in constructing a tiling coil is to achieve magnetic field (H-Field) uniformity by combination of more than one coil. Simply tiling arbitrary coils without optimized coil design, may result in a non-uniform H-Field because the superposition of positive field inside each turn and negative field outside each turn produces field distribution variations (i.e., valleys and peaks).

In one embodiment, the coils (and tiles) are designed and positioned with respect to each other so as to have an overall uniform field. The superposition of the field of each turn of each coil is optimized to ensure a uniform field. Certain optimization procedures were developed according to the disclosed embodiments to control the relative position of the coils and the shape of their turns to thereby produce an optimized uniform field.

In an exemplary implementation, two sets of coils were designed and constructed to demonstrate the advantages of the disclosed embodiments (tiled-coils) as compared to the conventional single large coil design. The comparisons, which is discussed below, shows significant improvement of coil's loss and coupling with a small power receiving unit (PRU).

Figures 4A, 4B:
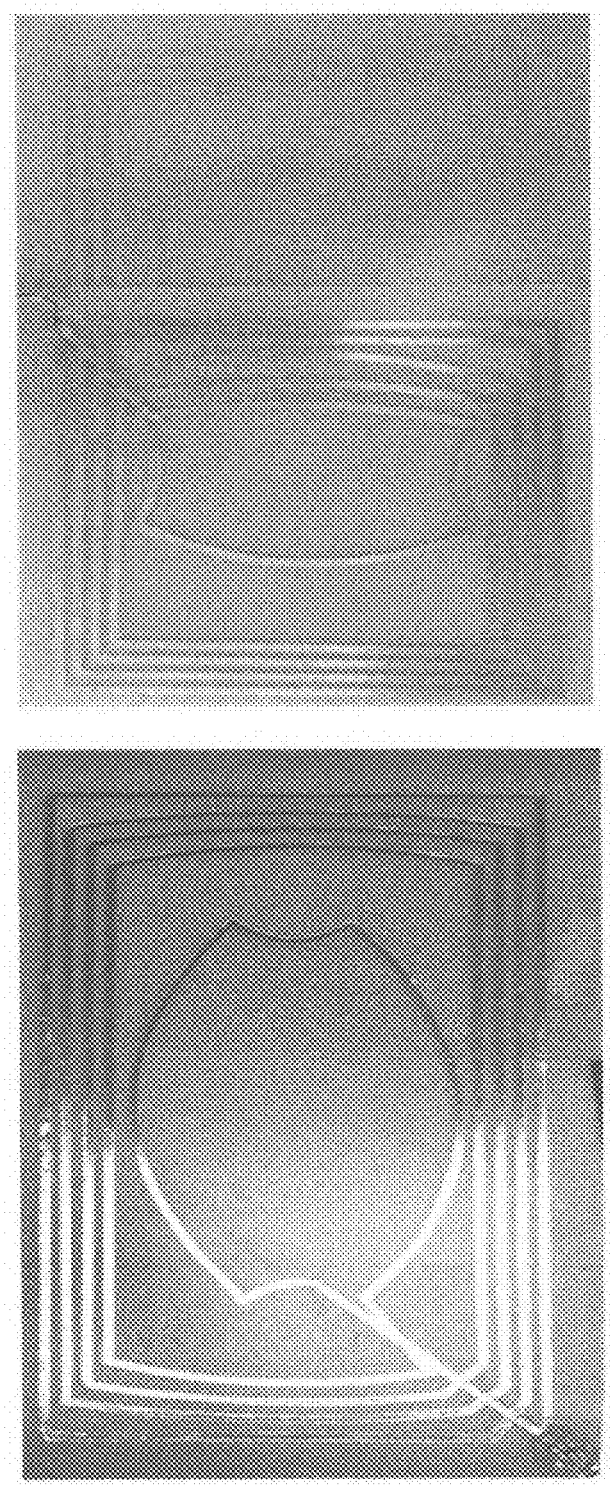
FIG. 4A shows a conventional coil.
FIG. 4B shows a tiled coil configuration according to one embodiment of the disclosure.

FIG. 4A shows a conventional coil, and FIG. 4B shows a coil tiling according to one embodiment of the disclosure. Specifically, FIGS. 4A and 4B show two transmitter coil assemblies with identical sizes. The coil shown in FIG. 4A uses a conventional single spiral coil topology. The coil in FIG. 4B was constructed as tiling of two spiral coils according to one embodiment of the disclosure. FIG. 4A had a larger trace length than the coil in FIG. 4B. Both coil designs provided 5 turns and were constructed using the same prototyping method. Finally, both coil sets were optimized for field uniformity.

TABLE 1 shows the measured AC resistance of coils shown in FIGS. 4A and 4B. Specifically, TABLE 1 shows that the tiling design of FIG. 4B had much lower AC losses than conventional large coil design of FIG. 4A despite its longer overall trace length. The coupling efficiency measured against the same PRU coil also favors the 2×1 tiled-coil design of FIG. 4B by about 10%.

TABLE 1

Performance comparison between a conventional coil design and a tiled-coil design according to the disclosed embodiments.

|  | (a) One coil | (b) two coil tiling |
|---|---|---|
| AC resistance | 11 ohm | 6.7 ohm |
| Coupling efficiency with PRU | 67% | 76% |

A key consideration of the A4WP-compliant transmitter coil is the effective coupling to a wearable Category-1 PRU device. As discussed below, the disclosed tiled-coil design improves coupling efficiency for Category-1 PRU devices by covering the active area with two or more small coils.

FIG. 5A shows a conventional coil, FIG. 5B shows a two-coil tiling, FIG. 5C shows a phone receiver coil size, and FIG. 5D shows a wearable receiver coil size. Here, two identical size coils were constructed. One of the coils used the conventional single spiral coil topology (FIG. 5A) while the other had two-tiled (2×1) coils according to an embodiment of the disclosure (FIG. 5B). Both designs had 5 turns and were constructed using the same prototyping method. Both designs were optimized for field uniformity.

TABLE 2 summarizes the performance comparison between the different coils of FIGS. 5A and 5B. As shown in TABLE 2, the measured AC resistance of the two coil tiling design is similar to the conventional spiral design. However, the tiled coil provided overall higher coupling with two different size PRU coils (as exemplified in measured coupling impedance $Z_{21}$ results). Importantly, while the two designs offered similar coil coupling efficiency as measured against the same phone-sized PRU coil (FIG. 5C), the tiled-coil design offered a much higher coil coupling efficiency as compared with the much smaller wearable coils. The higher efficiency is caused by a larger mutual coupling that results with less size discrepancy as discussed in relation to the embodiment of FIG. 2.

TABLE 2

Performance comparison between tiled and conventional coil

|  |  | (a) Conventional Coil | (b) Tiled coil |
|---|---|---|---|
| Phone | AC resistance | 3 Ohm | 3.5 Ohm |
|  | Coupling variation (z21 max/min) | 26.9 Ohm (max) 25.6 Ohm (min) | 31.2 Ohm (max) 28.7 Ohm (min) |
|  | Coupling efficiency | 89% | 89% |
| Wearable | Coupling variation (z21 max/min) | 6.3 Ohm (max) 4 Ohm (min) | 7.5 Ohm (max) 4.6 Ohm (min) |
|  | Coupling efficiency | 39% | 46% |

The above examples show that equal or higher coupling uniformity may be achieved with the tiled-coil design in accordance with the disclosed embodiments.

FIG. 6 shows an exemplary unit tile of a (2×1) tiled-coil array according to an embodiment of the disclosure. Specifically, FIG. 6 shows the dimensions of one of two tiles having the tiled-coil shown in FIG. 4B. The structure of the tiled-coil of FIG. 6 is optimized such that the combined 2 coil solution (as shown in FIG. 4B) when connected in series offers maximum field uniformity within the combined coil area.

In one implementation, the design goal was to optimize structure and placement of two coils in a tile to produces maximum filed uniformity. A separate building block was used to build each turn of the coils. The building block included a group of variables that controlled shape of the coil turns. A conventional building block has several degrees of freedom (e.g., a rectangular coil has length, width and center location). The building block may be flexible to take the shape that produces a substantially uniform field. In one embodiment, the building block was configured with a few degrees of freedom so as to simplify the optimization process.

Thus, an embodiment of the disclosure is directed to a single coil block which forms the building block of the tiled-coil system. In an exemplary embodiment, the building block may be rectangular with curved sides. The curvature may be configured based on a quadratic function. The quadratic function of one side may be defined by the two vertices and a negative or positive line extending (bulging) at the middle. Each turn may have eight degrees of freedom.

FIG. 7 illustrates a block of the coil turns according to an exemplary embodiment of the disclosure. The coil of FIG. 7 has eight degrees of freedom with four sides curved outwardly. Other shapes can be used with the tiled layout as disclosed herein. The building block variables of FIG. 7 represent a rectangle with a width of A+An, length of B+Bn, curvatures of C, Cn, D, Dn, x center of (A−An)/2, and y-center of (B−Bn)/2. Building a coil block based in these variables rather than center, width and length simplifies the optimization process. The disclosed embodiments simplify defining the constraints that prevent the loops of intersecting coils.

TABLE 3 shows the dimension of each coil turn shown in FIG. 6. Sides B and D equal to Bn and Dn respectively because the coil is symmetric with respect to the x-axis. The distance between the centers of the two coils is $X_{dif}=15.7$ cm is the x direction. The sides B, D, Bn and Dn values are the same as those shown in FIG. 5. In FIG. 6, the outer two loops are squares because An, A, B, Cn, C for those loops are equal, as an optimization outcome and due to adhering to the constraints defined for maximum coil dimension (i.e., 10 cm).

TABLE 3

Dimensions (cm) of an Exemplary Coil Turns

| Turn | 1 | 2 | 3 | 4 | 5 |
|---|---|---|---|---|---|
| An | 10 | 9.05 | 6.84 | 5.78 | 4.64 |
| A | 10 | 9.2 | 8.4 | 7.6 | 1.14 |
| B = Bn | 10 | 9.2 | 8.4 | 7.6 | 6.79 |
| Cn | 10 | 9.2 | 8.4 | 6.78 | 5.54 |
| C | 10 | 9.2 | 8.4 | 7.6 | 3.09 |
| D = Dn | 10 | 9.2 | 8.4 | 7.6 | 6.10 |

Figure 8B:
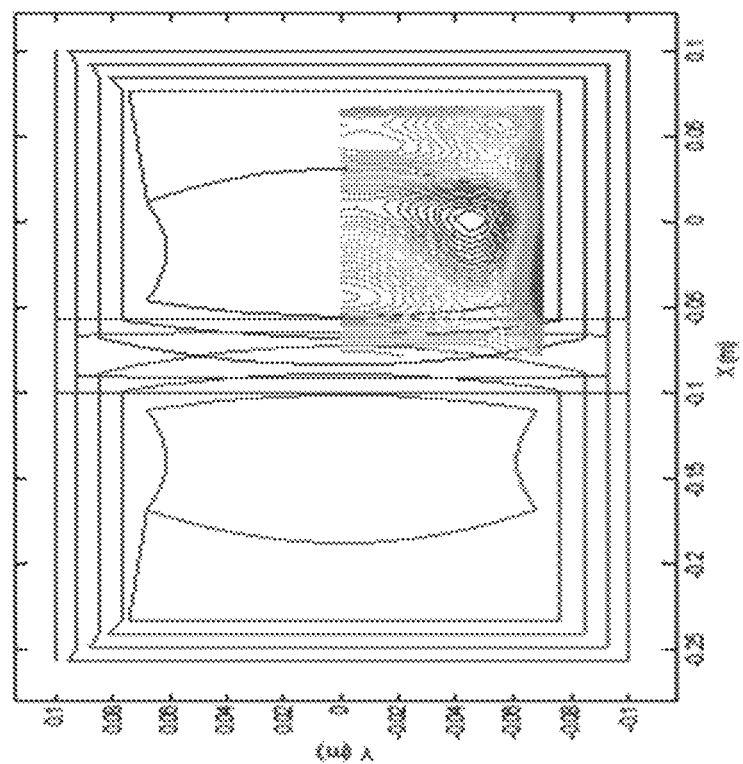
FIG. 8B shows the optimization area of FIG. 8A.
Figure 8A:
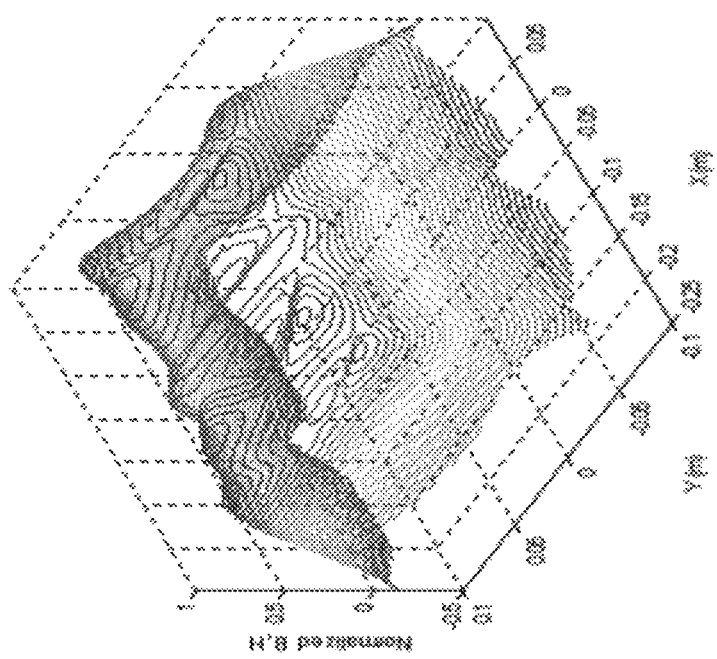
FIG. 8A shows optimized normalized z-direction magnetic field (Hz) produced using Biot-Savart law at $z_0=2.5$ cm.

In one embodiment, the optimization process includes of monitoring field uniformity over a desired area. Field uniformity may be observed at various heights. FIGS. 8A and 8B show—an exemplary optimization process according to one embodiment of the disclosure. Specifically, FIG. 8A shows optimized normalized Hz produced using Biot-Savart law at height of 2.5 cm above the coil surface. FIG. 8B shows an exemplary optimized circuit according to one embodiment of the disclosure. In the exemplary implementation of FIG. 8B, the area of interest was about 2.5 cm above the coil plane. The area of interest was substantially equal to the area occupied by the two tiled coils (FIG. 8B). Instead, the area of interest boarders was about 3 cm inward to the coil's outer borders because the magnetic field strength shrinks as compared to the coil area at a height of about 2.5 cm above the coil surface.

Because of symmetry of the design along the horizontal and vertical axis, the optimization was made over a quarter of the area. The optimization area is shown at the right hand corner of FIG. 8B. The uniformity of the magnetic field defined as STD(Hz)/MEAN(Hz) was observed at about 7.2%; where STD denotes the standard deviation.

Figure 9:
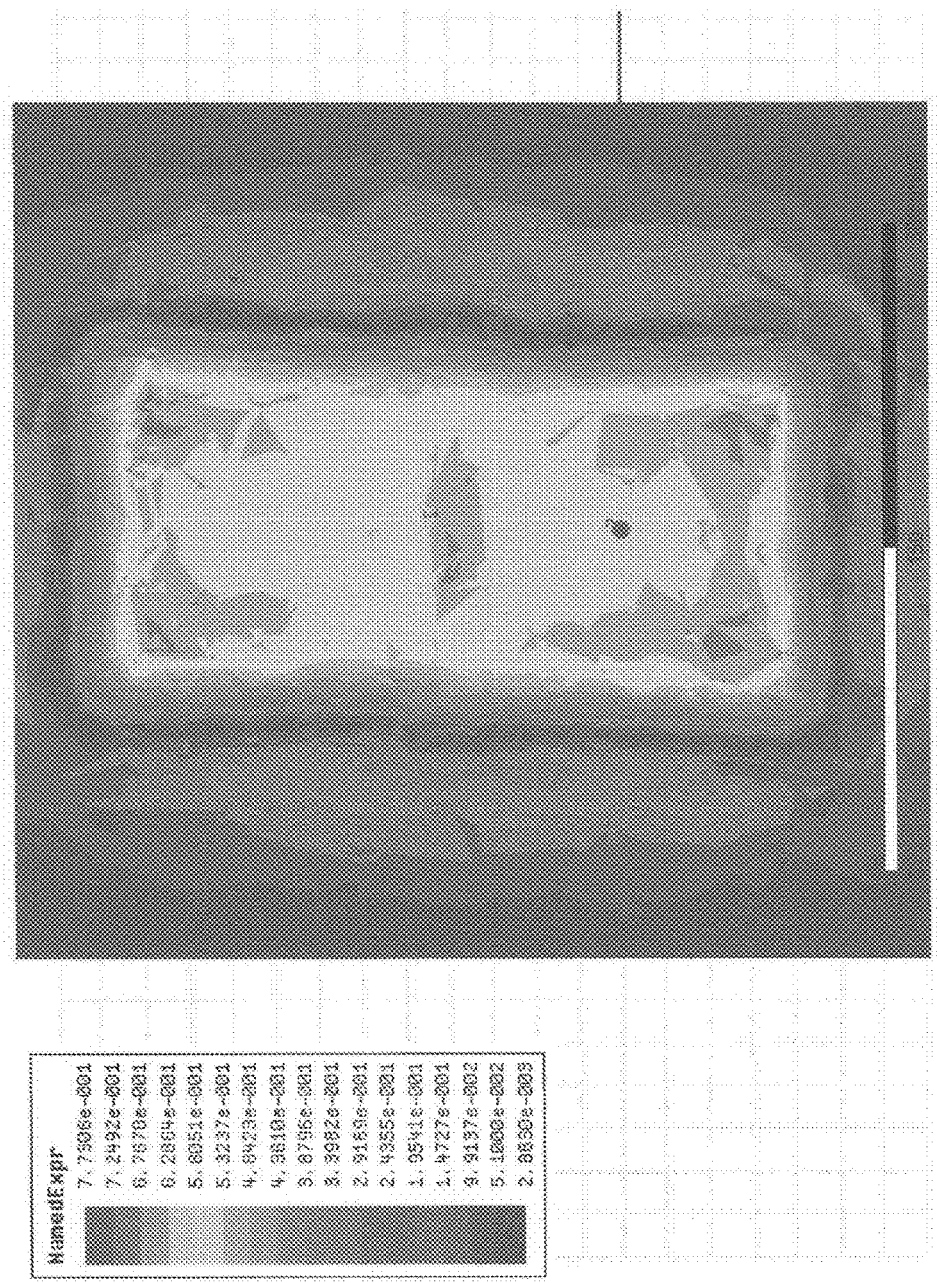
FIG. 9 illustrates the magnetic field strength (Hz) at a height of 2.5 cm above the coil surface.

The tiled layout design of FIG. 8B was verified using an FEM electromagnetic software at z=2.5 cm. FIG. 9 shows the simulated uniform Hz field produced by the tiled coil of FIG. 8B. The magnetic field is similar to the field produced by Biot-Savart law as shown in FIG. 8A.

Figure 10:
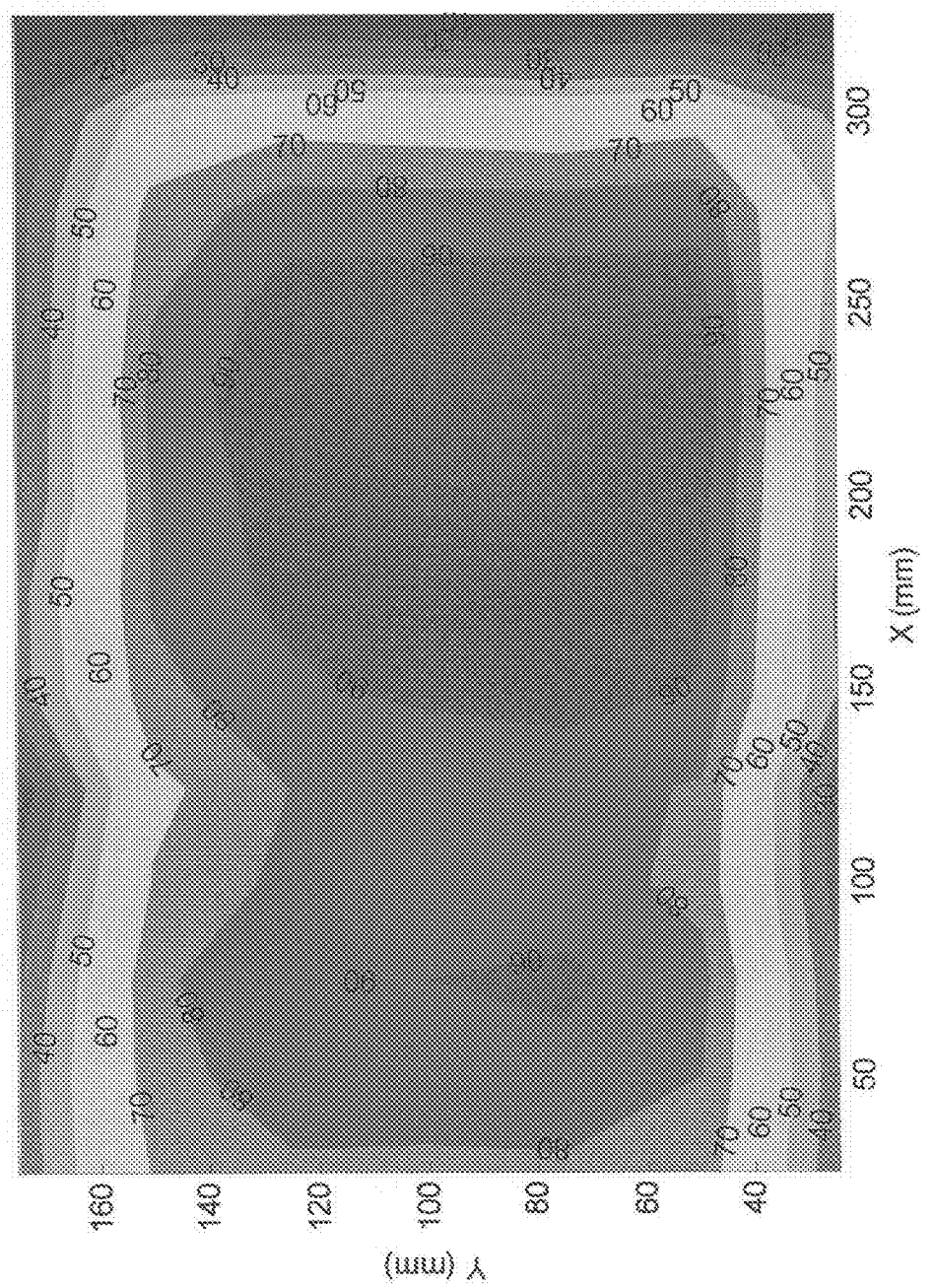
FIG. 10 shows measured power transfer as a small coil was scanned over the 2×1 tiling area in accordance with one embodiment of the disclosure.

A Vector Network Analyzer (VNA) was used to measure power transfer efficiency from the transmitter tiled-coil of FIG. 8A to a small receiver coil (not shown). The receiver coil was scanned over the area of the 2×1 tiling at a height of about 2.5 cm above the tiles. The normalized measured efficiency was collected and is shown in FIG. 10. The normalized field of FIG. 10 show substantially uniform magnetic field over the transmitter tiled-coil area.

In certain embodiments, the disclosure is directed to an optimization process and methodology. The optimization process may be configured as a function of the magnetic field at a distance above the transmitter coils. The transmitter coils may be tiled in accordance with the disclosed embodiments. The magnetic field may be measured at an exemplary distance of about 2.5 cm above the coil. In an exemplary implementation, the optimization goal may be maximizing magnetic field uniformity (i.e., minimizing the standard deviation of the field STD(Hz)/Mean(Hz).) The Boit-Savart law of Equation (1) may be used to quantify the magnetic field (B). For uniformity calculation, H (magnetic flux density) and B fields may be used interchangeably.

$$B(x_o, y_o, z_o) = \frac{\mu_0}{4\pi} \int_C \frac{Idl \times \hat{r}}{|r|^2} \tag{1}$$

In Equation (1), location $(x_0, y_0, z_0)$ is the observation point; r is the vector from the coil to the observation point; $\hat{r}$ is a unit vector in direction of r; l is the current going through the coil; dl is a vector with magnitude equal to differential element; $\mu_0$ is the magnetic constant representing the permeability of free space. Direction of dl may be assumed to be the same as the current. The integration is a line integral that may be evaluated over the entire coil path.

The Biot-Savart law may be applied to calculate the magnetic field produced by an arbitrary current filament. The arbitrary current filament may include spiral, concentric current loops or other suitable shapes or combination of shapes. The Biot-Savart law, in its integration form, is not suitable for computer calculation. Consequently, The integral form may be converted into a summation as shown in Equation (2) to be implemented in software:

$$(x_o, y_o, z_o) = \frac{\mu_0}{4\pi} \sum_n \frac{l \Delta l \times \hat{r}_n}{|r_n|^2} \quad (2)$$

In Equation 2, $r_n$ is the vector form segment n to the observation point and $\Delta l$ is the length of segment n. The optimization process may start with arbitrary initial values for each turn dimensions that are called initial population. Biot-Savarat law in Equation (2) may be used to calculate the magnetic field at each point at the required z distance above the coil and, for the exemplary area shown in FIG. 8B, by contour lines. The cost function STD(Bz)/Mean(Bz) may be calculated across the required area. A genetic algorithm may be used to repeat the process until the cost function ceases to drop. The algorithm may end when the change in the cost function is less than a pre-defined threshold.

As stated, an embodiment of the disclosure relates to a transmitter charging station having a tiled-coil layout. Two or more tiles may be arranged to provide a uniform charging field. Each of the tiles may have a symmetric or an asymmetric coil layout designed consistent with the disclosure. In an exemplary tiled design, two coiled tiles were formed. Each tile had dimensions of about 20 cm in width and length. The trace width was about 4 mm to minimize the trace resistance and the minimum trace spacing was about 4 mm to minimize the intra-turns capacitance. Each coil had five turns that was substantially a square with curved sides similar to those discussed above.

Figure 11:
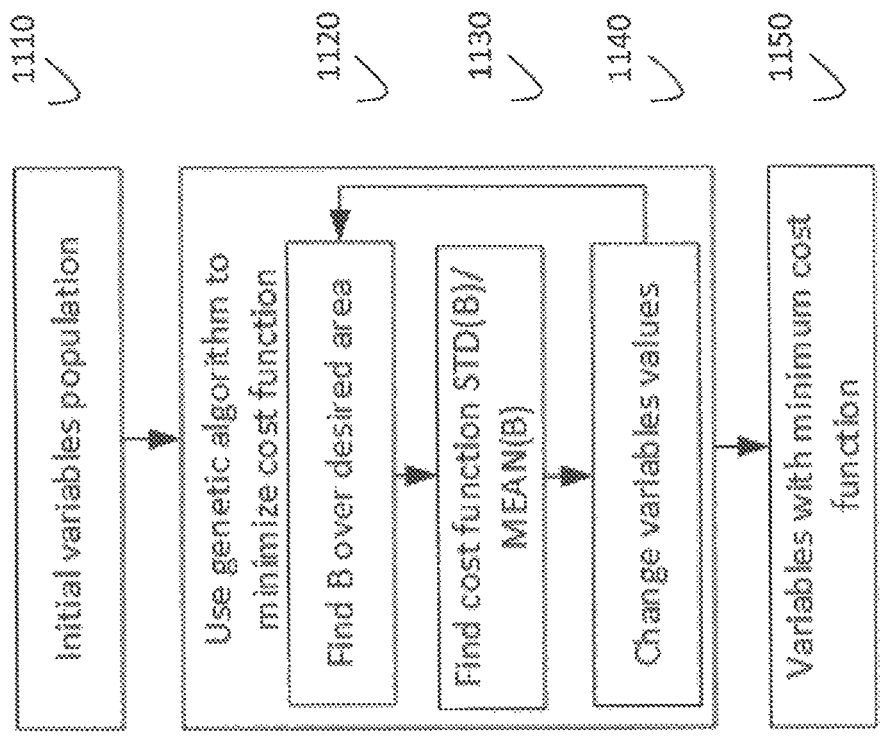
FIG. 11 is an exemplary optimization flow diagram according to one embodiment of the disclosure.

As discussed in relation to FIGS. 6 and 7, the optimization variables include the coil's dimensions: A, $A_n$, B, C, $C_n$, D. To determine the optimization problem, constraints for each optimization variables may be considered. As illustrated in TABLE 1, the outermost turn is the first turn whose dimensions may reasonably not exceed 10 cm to maintain the coil size 20×20 cm² (i.e., $A_1 = An_1 = B_1 = C_1 = Cn_1 = D_1 \leq 10$ cm.) In addition, for each inner turn, the dimensions should reasonably not exceed the dimensions of the next greater turn. In an exemplary embodiment, a spacing of about 8 mm may be allotted to leave a space for the trace width and the gap (e.g., $A_t > A_{t-1} + 8$ mm). Thus, the optimization problem may be defined by Equation (3) as follows:

$$\arg_{A_t, An_t, B_t, C_t, Cn_t, D_t} \min\left(\frac{STD(B \cdot \hat{z})}{MEAN(B \cdot \hat{z})}\right), \quad (3)$$

subject to: $0 < A_t, An_t, B_t, C_t, Cn_t, D_t < 10$ cm where, $z_o = 2.5$ cm, $-\frac{X_{dif}}{2} < x_o < 7$ cm, $0 < y_o < 7$ cm $\quad (4)$ $(A_t, An_t, B_t, C_t, Cn_t, D_t) > \quad (5)$
$(A_{t-1}, An_{t-1}, B_{t-1}, C_{t-1}, Cn_{t-1}, D_{t-1}) + 8$ mm FIG. 11 is a flow diagram of a genetic optimization process according to one embodiment of the disclosure. The flow diagram or algorithm of FIG. 11 starts at step 1110 with an arbitrary initial population selected by the designer. The initial population represents variable values that are considered to approximate the optimized design. Steps 1120 to 1140 are the genetic algorithm. The z component of the magnetic field is found over the desired area. The cost function STD(B)/Mean(B) is calculated using B values. The algorithm successively changes variables values by repeating steps 1120 to 1140. The algorithm ends after reaching to variables values with minimum cost function at step 1150. Once the optimal design is configured, the coil design may be coupled to a matching network and then connected to the wireless charging transmitter module. The matching network may include one or more dynamic tuning circuitry.

The disclosed coil technique allows development of wireless charging transmitter solutions that cover large active areas and can support multiple devices simultaneously. The disclosed embodiments may be particularly applicable to large wireless charging infrastructure deployment. The highly uniform field transmitter coil provides significant performance advantage as compared with the conventional wireless charging stations.

Figure 12:
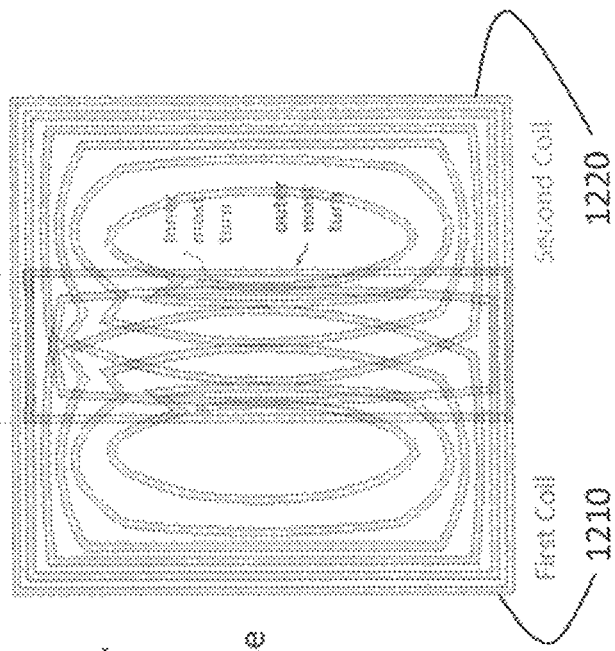
FIG. 12 shows an exemplary overlap between a first and a second coil according to one embodiment of the disclosure.

The optimization algorithm disclosed in FIG. 11 may be applied to design tiled-coils having a predetermined overlap distance. One such exemplary design according to the disclosed principles is shown at FIG. 12. In FIG. 12, first coil 1210 overlaps second coil 1220. The overlap distance is d. The distance may be between 10-50% of the length or width of one of the first or second coils. Each coil has an inner most turn and outer most turns. First coil 1210 is shown with an asymmetric layout as the left hand side has a different turn layout as the right hand side of the coil. The disclosed embodiments, however, are not limited to tiled-coils having an asymmetric layout. Symmetric coils may be used without departing from the disclosure. When first coil 1210 and second coil 1220 are partially overlapped (d), the outer most turn of one coil tile (for a multi-turn spiral) overlaps with our extends beyond the inner most turn of the other coil tile.

The exemplary layout of FIG. 12 may be applied to more than two coils. For example, a tiled design may comprise three or more coils overlapped with constant or varying overlapping distances (i.e., $d_1, d_2, d_3 \ldots$). Moreover, the coil design of each tile may be the same as other coils in the tile or may be different from the other coils. A substantial magnetic field may be generated above the plane of the overlap by varying design elements disclosed herein.

The unique combination of two or more coils in a tile layout shows clear advantages over a conventional large coil in terms of higher coupling and lower losses. The tiled layout enables efficient charging of large devices such as laptops and the like by providing a large active area that is substantially and significantly uniform in charging capacity.

Figure 13:
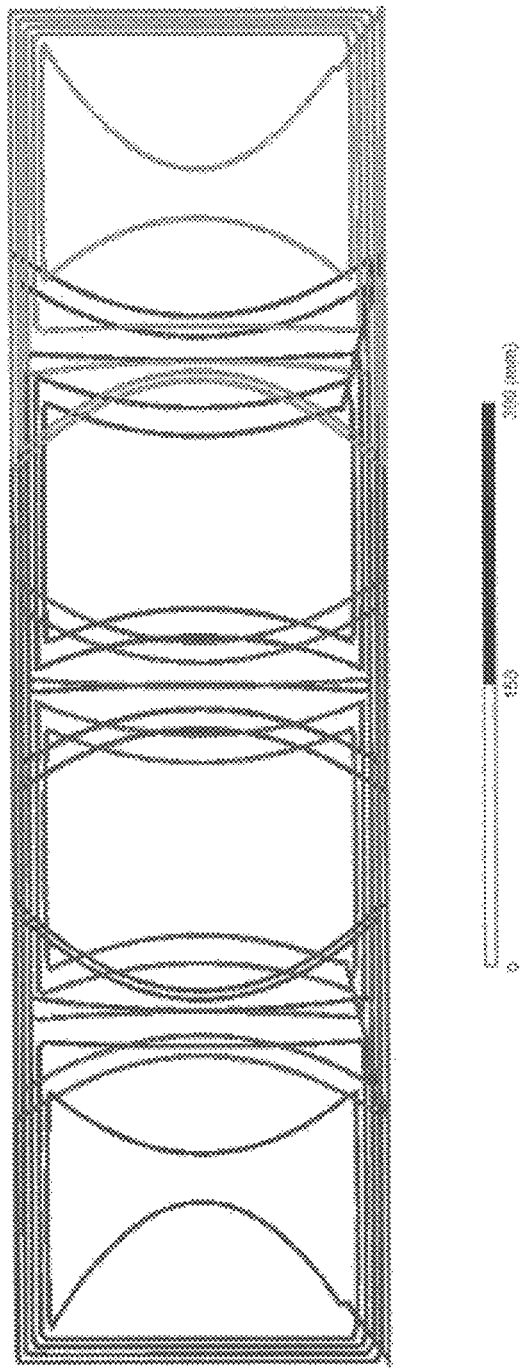
FIG. 13 schematically shows a one-by-four (1×4) tiled-coil array according to one embodiment of the disclosure.
Figure 14:
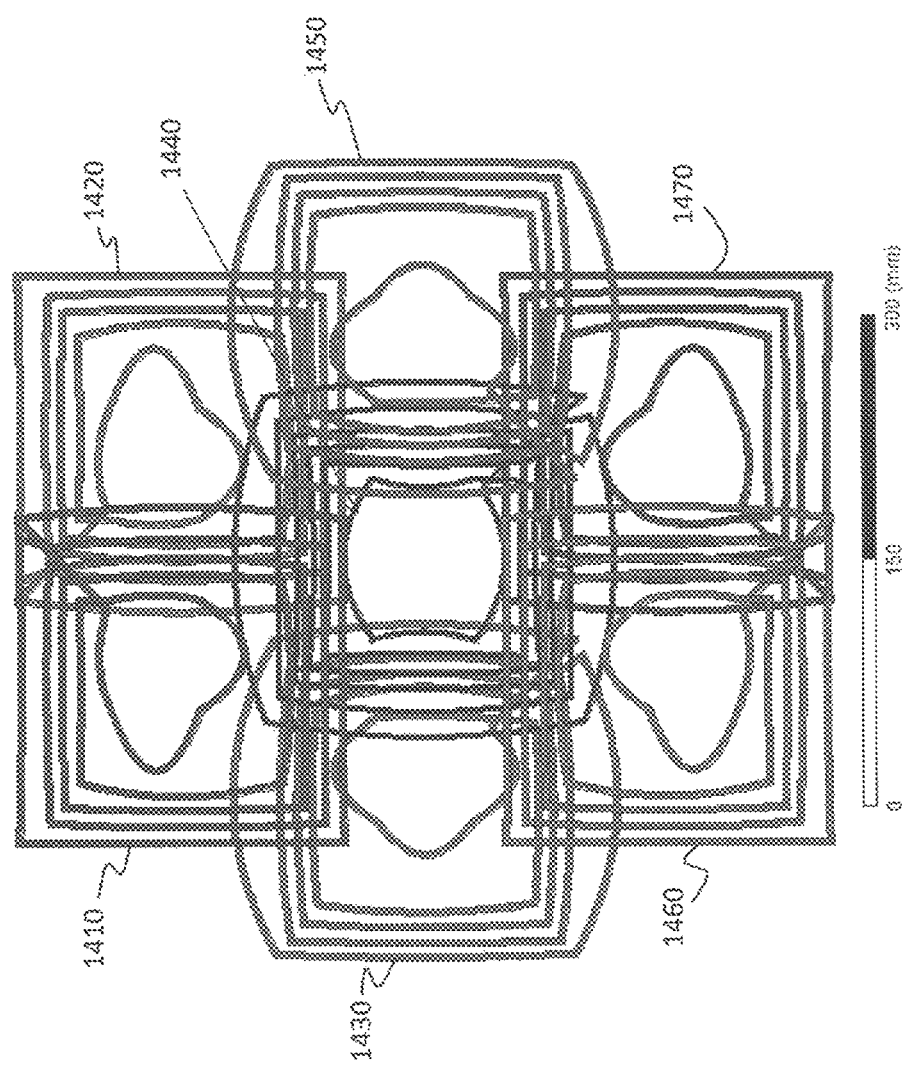
FIG. 14 schematically shows a two dimensional design having seven tiled coils to cover a large area.
Figure 15:
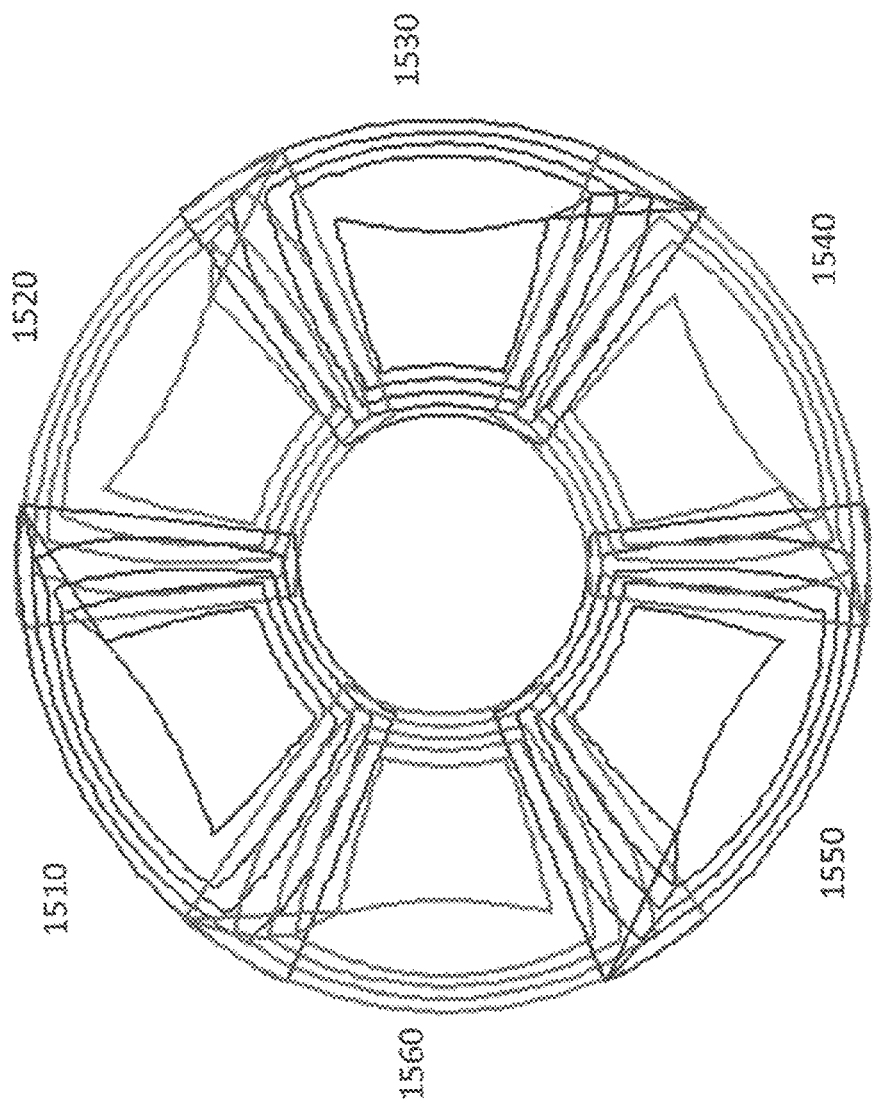
FIG. 15 illustrates a ring pattern of tiled coils according to one embodiment of the disclosure; and, FIG. 16 schematically illustrates an exemplary PTU layout according to one embodiment of the disclosure.

Alternative embodiments using the tiling coil design is shown in FIGS. 13-15. FIG. 13 shows a one-by-four (1×4) coil array constructed by connecting four tuned coil in series along one line. The embodiment of FIG. 13 provides a uniform, rectangular, magnetic charging field at a distance z above the surface of the tiled-coils.

FIG. 14 shows a two dimensional tiled-coil design covering a larger area. In FIG. 14, seven coils with optimized design layout were connected in series and tailed to provide maximum magnetic field. Each coil was tiled with an adjacent coil. Each of coils 1410, 1420, 1430, 1440, 1450, 1460 and 1470 is optimized such that the combined field of the seven coils is uniform within the enlarged charging area.

FIG. 15 shows another exemplary tiled-coil design having a circular pattern. In FIG. 15, six (6) coils 1510, 4520, 1530, 1540, 1550 and 1560 were tiled to form a circular design. As in the prior embodiments, each coil of the tile was optimized to provide a uniform combined magnetic field.

FIG. 16 schematically illustrates an exemplary PTU layout according to one embodiment of the disclosure. Specifically, FIG. 16 schematically shows first coil circuit 1610 and second coil circuit 1620. Each of first coil circuit 1610 or second coil circuit 1620 may comprise a geometry configured to provide a substantially uniform magnetic field thereabove. While not shown in the illustration of FIG. 16, first coil circuit 1610 and second coil circuit 1620 may be share an overlapping area. First coil circuit 1610 also includes first tuner 1615. First tuner 1615 may comprise one or more tuning circuits for affecting the resonance frequency of the first coil 1610. The tuning circuit may comprise one or more capacitor positioned to tune the resonance frequency of the first coil circuit 1610 or the second coil circuit 1620. Capacitor 1630 is positioned between first coil circuit 1610 and second coil circuit 1620. Capacitor 1630 may connect first coil circuit 1610 and second coil circuit 1620 in series. Capacitor 1630 may also be combined into the 1st or 2nd tuner.

In an exemplary implementation, first tuner 1615 and second tuner 1625 along with capacitor 1630 are used to tune the resonance frequency of the respective first and second coil circuits 1610, 1620 to provide a substantially uniform magnetic field above the surface of the coils. A combination of the $1^{st}$ and $2^{nd}$ tuners connected in series may be designed to match the reactance of capacitor 1630. This will enable achieving the maximum quality factor of the combined coil.

Controller 1640 may be optionally provided to tune first capacitor 1615 and/or second capacitor 1625. Controller 1640 may be configured to change the resonance frequency of first coil circuit 1610 and second coil circuit 1620 to provide substantially similar resonance frequency from each of the first and the second coil circuits.

The following non-limiting and illustrate examples are provided to illustrate various embodiments of the disclosure. Example 1 is directed to a transmitter charging station, comprising: first coil having a first layout geometry to provide a first resonant magnetic field; a second coil having a second layout geometry to provide a second resonant magnetic field, the second coil overlapping the first coil such that a combination of the first and the second magnetic fields provides a substantially uniform magnetic field above an overlapping plane of the first and the second coils.

Example 2 is directed to the charging station of example 1, wherein the first coil and the second coils are arranged as partially overlapping tiles.

Example 3 is directed to the charging station of example 1, wherein the first coil and the second coils are connected in series.

Example 4 is directed to the charging station of example 1, wherein at least one of the first coil or the second coil defines an asymmetric or skewed coil turns.

Example 5 is directed to the charging station of example 1, further comprising a third coil having a third layout geometry.

Example 6 is directed to the charging station of example 4, wherein the third coil at least partially overlaps the second coil to extend the magnetic field of the first and the second coil.

Example 7 is directed to the charging station of example 1, wherein the second coil overlaps the first coil in a range of about 10-50% of a length of one of the first or the second coils.

Example 8 is directed to the charging station of example 1, wherein an outer-most turn of the first coil extends beyond the inner most turn of the second coil.

Example 9 is directed to the charging station of example 1, wherein the first coil defines a symmetric geometry and the second coil defines an asymmetric geometry.

Example 10 is directed to a wireless charging station, comprising: a first coil having a first resonance frequency tuner; a second coil having a second resonance frequency tuner; a capacitor connecting the first and the second coils; a power source connected to the first coil and the second coil; and a controller to configure at least one of the first or the second frequency tuners to provide substantially similar resonance frequency from each of the first and the second coils.

Example 11 is directed to the wireless charging station of example 10, wherein at least one of the first coil or the second coil defines an asymmetric or skewed coil turns.

Example 12 is directed to the wireless charging station of example 10, wherein the first and the second coils are connected in series.

Example 13 is directed to the wireless charging station of example 10, wherein the first coil is positioned to overlap the second coil.

Example 14 is directed to the wireless charging station of example 13, further comprising a third coil wherein the third coil overlaps one or more of the first or the second coils.

Example 15 is directed to the wireless charging station of example 10, wherein an outer-most turn of the first coil extends beyond the inner most turn of the second coil.

Example 16 is directed to the wireless charging station of example 10, wherein the first coil defines a symmetric geometry and the second coil defines an asymmetric geometry.

Example 17 is directed to a method to provide a substantially uniform magnetic field over a power transmission unit (PTU), the method comprising: forming a first coil to provide a first resonance frequency; forming a second coil to provide a second resonance frequency; tuning one or more of the first coil or the second coil to provide substantially similar resonance frequencies; overlapping first and the second coils to provide a substantially uniform magnetic field over the first and the second coils.

Example 18 is directed to the method of example 17, wherein the first coil has a multi-sided layout in which at least one side is curved outwardly.

Example 19 is directed to the method of example 17, further comprising connecting the first and the second coils in series.

Example 20 is directed to the method of example 17, further comprising interposing a tuning capacitor between the first and the second coils.

Example 21 is directed to the method of example 17, further comprising determining an overlap distance as a function of a combined magnetic field strength of the first coil and the second coil at the overlap region.

Example 22 is directed to the method of example 17, further comprising tuning the first resonance frequency of the first coil by tuning the capacitance of at least one capacitor associated with the first coil.

Example 23 is directed to the method of example 20, further comprising tuning a first capacitor associated with the first coil and a second capacitor associated with the second coil such that the tuning capacitor has substantially same value as either the first or the second capacitors.

Example 24 is directed to the method of example 23, further comprising connecting the first capacitor, second capacitor and the tuning capacitor in series.

Example 25 is directed to the method of example 17, further comprising a power receiving unit (PRU) proximally exposed to the substantially uniform magnetic field to thereby an receive electrical field charge from the PTU.

While the principles of the disclosure have been illustrated in relation to the exemplary embodiments shown herein, the principles of the disclosure are not limited thereto and include any modification, variation or permutation thereof.

What is claimed is:

1. A transmitter charging station, comprising:
   a first coil having a first layout to provide a first resonant magnetic field;
   a second coil having a second layout to provide a second resonant magnetic field, the second coil overlapping the first coil;
   wherein the second coil overlaps the first coil with an overlap distance in a range of about 10-50% of a width of the first coil, wherein the width comprises a shortest distance across the center of the first coil between outer-most edges of an outer-most turn of the first coil; and
   wherein the outer-most turn of the first coil extends beyond an inner-most turn of the second coil in a direction of the overlap distance.

2. The charging station of claim 1, wherein the first layout and the second layout each comprises a symmetric geometry.

3. The charging station of claim 1, further comprising a third coil having a third layout and partially overlapping the second coil, wherein the third layout comprises a geometry of the first layout.

4. The charging station of claim 1, wherein the first layout and the second layout each comprise a rectangular geometry.

5. The charging station of claim 1, wherein the first layout and the second layout each comprises a multi-sided layout, wherein each side of the multi-sided layout is curved outwardly.

6. The charging station of claim 1, comprising a third coil that at least partially overlaps the second coil to extend the magnetic field of the first and the second coil.

7. The charging station of claim 1, wherein the first coil and the second coil are tiled with a plurality of additional coils to form a circular design.

8. The charging station of claim 1, wherein the first layout comprises a symmetric geometry and the second layout comprises an asymmetric geometry.

9. The charging station of claim 1, wherein the first layout or the second layout comprises a multi-sided layout in which at least one side is curved outwardly.

10. The charging station of claim 1, further comprising a tuning capacitor coupled between the first coil and the second coil.

11. A coil array, comprising:
    a first coil having a first layout to provide a first resonant magnetic field;
    a second coil having a second layout to provide a second resonant magnetic field, the second coil overlapping the first coil;
    wherein the second coil overlaps the first coil with an overlap distance in a range of about 10-50% of a width of the first coil, wherein the width comprises a shortest distance across the center of the first coil between outer-most edges of an outer-most turn of the first coil; and
    wherein the outer-most turn of the first coil extends beyond an inner-most turn of the second coil in a direction of the overlap distance.

12. The coil array of claim 11, wherein the first layout and the second layout each comprises a symmetric geometry.

13. The coil array of claim 11, comprising a third coil having a third layout and partially overlapping the second coil, wherein the third layout comprises a geometry of the first layout.

14. The coil array of claim 11, wherein the first layout and the second layout each comprise a rectangular geometry.

15. The coil array of claim 11, wherein the first layout and the second layout each comprises a multi-sided layout, wherein each side of the multi-sided layout is curved outwardly.

16. The coil array of claim 11, comprising a the third coil that at least partially overlaps the second coil to extend the magnetic field of the first and the second coil.

17. The coil array of claim 11, wherein the first coil and the second coil are tiled with a plurality of additional coils to form a circular design.

18. The coil array of claim 11, wherein the first layout comprises a symmetric geometry and the second layout comprises an asymmetric geometry.

19. The coil array of claim 11, wherein the first layout or the second layout comprises a multi-sided layout in which at least one side is curved outwardly.

20. The coil array of claim 11, further comprising a tuning capacitor coupled between the first coil and the second coil.

* * * * *